United States Patent
Hu et al.

(10) Patent No.: US 11,454,306 B2
(45) Date of Patent: Sep. 27, 2022

(54) TRANSMISSION ASSEMBLY AND LIFTING COLUMN

(71) Applicant: ZHEJIANG JIECANG LINEAR MOTION TECHNOLOGY CO., LTD., Zhejiang (CN)

(72) Inventors: Renchang Hu, Zhejiang (CN); Xiaojian Lu, Zhejiang (CN); Weiqiang Li, Zhejiang (CN)

(73) Assignee: ZHEJIANG JIECANG LINEAR MOTION TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 16/477,177

(22) PCT Filed: Jan. 8, 2018

(86) PCT No.: PCT/CN2018/071763
§ 371 (c)(1),
(2) Date: Jul. 10, 2019

(87) PCT Pub. No.: WO2018/130127
PCT Pub. Date: Jul. 19, 2018

(65) Prior Publication Data
US 2019/0360567 A1    Nov. 28, 2019

(30) Foreign Application Priority Data
Jan. 10, 2017   (CN) .......................... 201710016583.0

(51) Int. Cl.
*F16H 25/20* (2006.01)
*B66F 3/10* (2006.01)

(52) U.S. Cl.
CPC ........... *F16H 25/2056* (2013.01); *B66F 3/10* (2013.01); *F16H 2025/204* (2013.01)

(58) Field of Classification Search
CPC ......... F16H 25/2056; F16H 2025/2059; Y10T 74/18672; B66F 3/10
See application file for complete search history.

(56) References Cited

U.S. PATENT DOCUMENTS

| 2,409,288 A | 10/1946 | Leland |
| 5,709,286 A | 1/1998 | Mead et al. |

(Continued)

FOREIGN PATENT DOCUMENTS

| CN | 2268019 | 11/1997 |
| CN | 101307817 | 11/2008 |

(Continued)

OTHER PUBLICATIONS

"International Search Report (Form PCT/ISA/210) of PCT/CN2018/071763," dated Apr. 3, 2018, with English translation thereof, pp. 1-4.

*Primary Examiner* — Bobby Rushing, Jr.
(74) *Attorney, Agent, or Firm* — JCIPRNET

(57) ABSTRACT

A transmission assembly includes a hollow spindle, an outer wall of which is provided with an outer thread; a transmission worm disposed in the hollow spindle; a first transmission nut which is thread-fitted with the transmission worm, wherein the hollow spindle is rotatably positioned relative to the first transmission nut in an axial direction, and an external portion of the first transmission nut is provided with a locking structure for limiting the first transmission nut from rotating; a second transmission nut which is thread-fitted with the hollow spindle; a bushing which is bushed outside of the hollow spindle, the second transmission nut being fixedly connected with the bushing; and a guide tube which is rotatably limited in the bushing.

11 Claims, 4 Drawing Sheets

(56) References Cited

U.S. PATENT DOCUMENTS

| | | | | |
|---|---|---|---|---|
| 7,495,359 B2 * | 2/2009 | Klinke | ............... | A47B 9/04 |
| | | | | 310/51 |
| 8,601,889 B2 * | 12/2013 | Lessing | ............... | F16H 25/2056 |
| | | | | 74/89.35 |
| 9,222,557 B2 * | 12/2015 | Wu | ............... | F16H 25/2056 |
| 9,480,333 B2 * | 11/2016 | Randlov | ............... | F16H 25/2056 |
| 2002/0116881 A1 * | 8/2002 | Zimmerman | ............... | E04B 9/00 |
| | | | | 52/126.6 |
| 2003/0183027 A1 | 10/2003 | Koch | | |
| 2010/0192715 A1 | 8/2010 | Vauchel et al. | | |
| 2012/0286221 A1 | 11/2012 | Doyle | | |
| 2015/0330486 A1 * | 11/2015 | Hu | ............... | F16H 57/023 |
| | | | | 74/89.14 |
| 2016/0047446 A1 * | 2/2016 | Hung | ............... | F16H 25/20 |
| | | | | 74/89.35 |

FOREIGN PATENT DOCUMENTS

| | | |
|---|---|---|
| CN | 104595307 | 5/2015 |
| CN | 106641148 | 5/2017 |
| CN | 206571923 | 10/2017 |
| EP | 2522619 | 11/2012 |
| JP | 2002349662 | 12/2002 |
| JP | 2009185907 | 8/2009 |
| WO | 2015180723 | 12/2015 |

\* cited by examiner

TRANSMISSION ASSEMBLY AND LIFTING COLUMN

CROSS-REFERENCE TO RELATED APPLICATION

This is a 371 application of the International PCT application serial no. PCT/CN2018/071763, filed on Jan. 8, 2018 which claims the priority benefits of China Application No. 201710016583.0 filed on Jan. 10, 2017. The entirety of each of the above-mentioned patent applications is hereby incorporated by reference herein and made a part of this specification.

BACKGROUND

Technical Field

Embodiments of the present disclosure generally relate to transmission devices, and more particularly relate to a transmission assembly and a lifting column.

Description of Related Art

Electric lifting columns are widely applied to fields such as home furniture and medical care. A tube body of a conventional electric lifting column generally includes an inner tube, a middle tube, and an outer tube, which are bushed sequentially from inside to outside, a bottom housing, an actuating device disposed in the bottom housing, and a transmission assembly in transmission fit with the actuating device. To maximize the stroke of an electric lifting column, the transmission assembly is generally arranged as an assembled set including a transmission worm and a hollow worm. Further, by providing a transmission nut on the inner tube and the middle tube, respectively, to fit the transmission nuts with the transmission worm and the hollow worm, relative telescoping of the inner tube, middle tube and outer tube may be implemented.

Currently, dependent on actual needs, there exist two manners of assembling an electric lifting column: orderly-assembled and reversely-assembled, wherein the orderly-assembled manner means the inner tube is connected to the bottom housing while the outer tube is propped on the ground, and the reversely-assembled manner means the outer tube is connected to the bottom housing while the inner tube is propped on the ground. However, the orderly-assembled lifting column and the reversely-assembled lifting column require different structures of transmission assemblies, such that they have to be separately manufactured and then assembled with the different structures of transmission assemblies. In other words, a conventional transmission assembly cannot be adapted to both the orderly-assembled lifting column and the reversely-assembled lifting column, which undoubtedly increases manufacturing costs.

SUMMARY

An object of the present disclosure is to provide a lifting column, which may solve the technical problem that a conventional transmission assembly cannot be adapted to both orderly-assembled lifting columns and reversely-assembled lifting columns.

To solve the technical problem above, the present disclosure adopts a technical solution below.

A transmission assembly includes a hollow spindle, an outer wall of which is provided with an outer thread; a transmission worm disposed in the hollow spindle, wherein the transmission worm may rotate synchronously with the hollow spindle and the transmission worm may be telescoped relative to the hollow spindle along an axial direction; a first transmission nut which is thread-fitted with the transmission worm, wherein the hollow spindle is rotatably positioned relative to the first transmission nut in the axial direction, and an external portion of the first transmission nut is provided a locking structure for limiting the first transmission nut from rotating; a second transmission nut which is thread-fitted with the hollow spindle; a bushing which is bushed outside of the hollow spindle, the second transmission nut being fixedly connected with the bushing; a guide tube which is rotatably limited in the bushing, the guide tube synchronously rotating with the hollow spindle, wherein the guide tube may be relatively telescoped relative to the hollow spindle in the axial direction.

Further, a lower end of the hollow spindle is fixedly connected with a guide bar; the guide bar is of a non-cylindrical structure; the guide tube has a non-round inner hole; the non-cylindrical structure and the non-round inner hole are adapted such that the hollow spindle and the guide tube are synchronously rotated.

Further, the hollow spindle is bushed with a first bearing, the first bearing being fixedly mounted to the first transmission nut.

Further, the locking structure comprises a plurality of projections provided on an outer wall of the first transmission nut, and a first locking block and a second locking block which are provided at an outer periphery of the first transmission nut, wherein the first locking block is provided with a first accommodation groove; the second locking block has a second accommodation groove; after the first locking block and the second locking block are engaged, the first accommodation groove and the second accommodation groove are engaged to form an accommodation space, wherein the first transmission nut is disposed in the accommodation space; on a groove wall of the first accommodation groove is provided a first snap groove, and on a groove wall of the second accommodation groove is provided a second snap groove, the first snap groove and the second snap groove being correspondingly snap-fitted with a projection, respectively.

Further, a side surface of the first locking block interfaced with the second locking block is provided with a first fixed column and a first fixed hole, a side surface of the second locking block interfaced with the first locking block is provided with a second fixed column and a second fixed hole, such that after the first locking block and the second locking block are engaged, the first fixed column is plug-fitted with the second fixed hole, and the second fixed column is plug-fitted with the first fixed hole.

Further, the transmission worm is bushed with a second bearing, the second bearing being fixed into a bearing seat.

The present disclosure further provides a lifting column, comprising: an inner tube, a middle tube, an outer tube, which are sequentially bushed from inside to outside, a bottom housing fixedly connected to an upper end of the inner tube, an actuating device disposed in the bottom housing, and a transmission assembly in transmission fit with the actuating device; wherein the transmission assembly refers to the one mentioned in any technical solution above; the actuating device is in transmission fit with an upper end of the guide tube; a lower end of the outer tube is provided with a base plate; a lower end of the transmission worm is rotatably positioned relative to the base plate in the axial direction; the locking structure is fixedly connected to a lower end of the middle tube; and the bushing is fixedly connected with the bottom housing.

Further, the actuating device comprises a motor, a worm connected to an output shaft of the motor, and a worm gear in transmission fit with the worm, wherein an irregular hole is provided on the worm gear, and power transmission between an inner hole of the guide tube and the irregular hole is implemented via a first irregular bar.

The present disclosure yet further provides a lifting column, comprising: an inner tube, a middle tube, an outer tube, which are sequentially bushed from inside to outside, a bottom housing fixedly connected to an upper end of the outer tube, an actuating device disposed in the bottom housing, and a transmission assembly in transmission fit with the actuating device; wherein the transmission assembly refers to the one mentioned in any technical solution above; the actuating device is in transmission fit with an upper end of the transmission worm; the locking structure is fixedly connected to an upper end of the middle tube; and a lower end of the bushing abuts against a lower end surface of the inner tube. Further, the transmission worm is sleeved with a second bearing, the second bearing being fixed in a bearing seat, the bearing seat being fixedly connected with the bottom housing.

Further, the actuating device comprises a motor, a worm connected to an output shaft of the motor, and a worm gear in transmission fit with the worm, wherein an irregular hole is provided on the worm gear, and power transmission between the transmission worm and the irregular hole is implemented via a second irregular bar.

The present disclosure has the following advantageous effects:

1. According to the present disclosure, the transmission worm, the hollow spindle, and the guide tube may implement synchronous rotation, such that the transmission worm and the guide tube may act as power input ends; only by flipping, the transmission assembly may be adapted to the requirements of both orderly-assembling and reversely-assembling of lifting columns, such that orderly-assembling and reversely-assembling techniques may be satisfied by only manufacturing one type of transmission assembly, which greatly lowers manufacturing costs.

2. As the guide tube has a non-round inner hole and the lower end of the hollow spindle is connected with a guide bar of a non-cylindrical structure, when the guide bar and the guide tube are rotated synchronously, the guide bar may also perform a linear telescoped motion along the non-round inner hole, such that the guide tube may not only serve as a power input end, but also may play a guide role for the hollow spindle, thereby enhancing stability of the transmission assembly.

3. Axial positioning of the hollow spindle relative to the first transmission nut is implemented by mounting the first bushing bushed at the upper portion of the hollow spindle to the first transmission nut, which enables the hollow spindle and the first bushing to be lifted or lowered synchronously; moreover, due to the prop function of the first transmission nut, it may be guaranteed that the hollow spindle rotates more stably and the mount structure between the first bearing and the first transmission nut is more compact.

4. The locking structure locks the first transmission nut through fitting of the grooves of the first locking block and the second locking block to projections of the first transmission nut, thereby limiting the first transmission nut from rotating, which implements bolt-free mounting between the locking structure and the first transmission nut, thereby simplifying the mounting process.

5. The lifting column of the present disclosure adopts the transmission assembly with the above advantages; by fixedly connecting the locking structure with the upper end or lower end of the middle tube and by transmit-fitting the actuating device with the upper end of the guide tube or the upper end of the transmission worm, a same transmission assembly structure may be adapted to both orderly-assembling and reversely-assembling of lifting columns, such that the mount structure is very compact, the mount process is quick and convenient, and the mount cost is lowered.

6. The actuating device adopted by the lifting column of the present disclosure implements power transmission via the irregular hole provided on the worm gear and the irregular bar body provided on the transmission work, which simplifies the components in actuation connection to the most extent and significantly improves the reliability of power transmission.

Specific technical effects of the present disclosure will be further illustrated in the preferred embodiments.

BRIEF DESCRIPTION OF THE DRAWINGS

Hereinafter, the present disclosure will be further illustrated with reference to the accompanying drawings and the preferred embodiments.

DESCRIPTION OF THE EMBODIMENTS

Hereinafter, preferred embodiments of the present disclosure will be described in further detail.

Embodiment I

Figure 1:
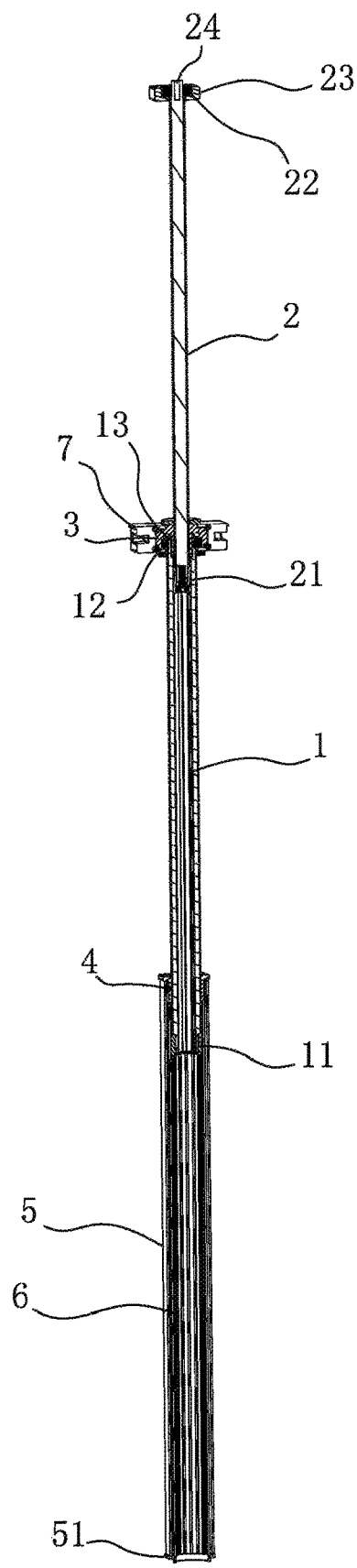
FIG. 1 is a sectional view of a transmission assembly in a first embodiment of the present disclosure.
Figure 2:
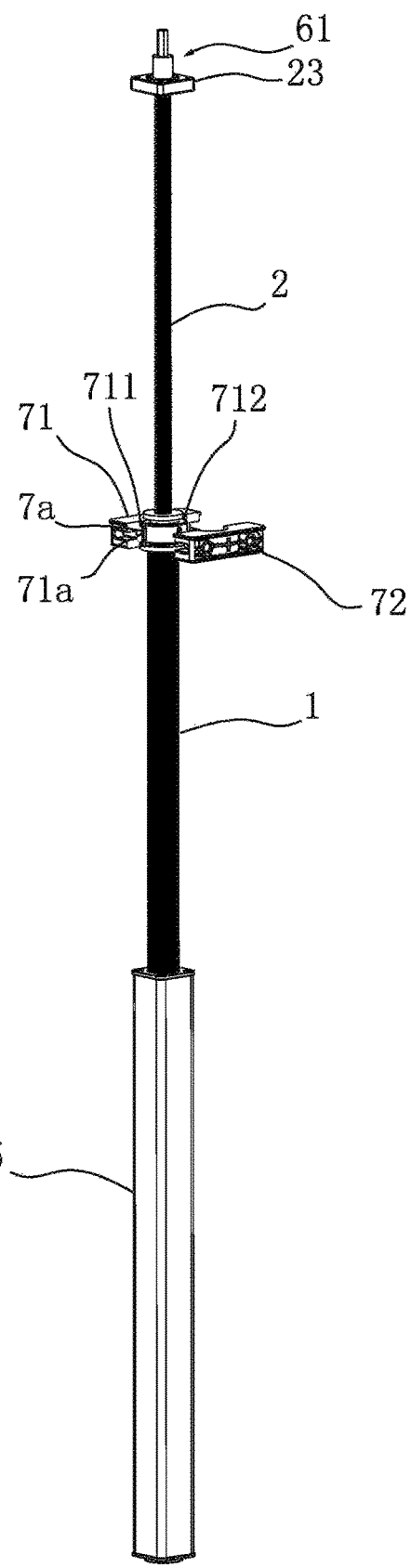
FIG. 2 is a structural schematic view of the transmission assembly in the first embodiment of the present disclosure.

As shown in FIGS. 1 and 2, a transmission assembly comprises a hollow spindle 1, a transmission worm 2, a first transmission nut 3, a second transmission nut 4, a bushing 5, and a guide tube 6. On an outer wall of the hollow spindle 1 is provided an external thread, and the transmission worm 2 is disposed inside the hollow spindle 1; the transmission worm 2 may be rotated synchronously with the hollow spindle 1, and the transmission worm 2 may be telescoped relative to the hollow spindle 1 in an axial direction. The first transmission nut 3 is thread-fitted with the transmission worm 2; the second transmission nut 4 is thread-fitted with the hollow spindle 1; the bushing 5 is bushed outside of the hollow spindle 1; the second transmission nut 4 is fixedly connected to an upper end of the bushing 5, a bottom of the bushing 5 is provided with a bottom cover 51, the guide tube 6 is accommodated inside the bushing 5 and is limited between the second transmission nut 4 and the bottom cover 51, such that the guide tube 6 may be rotatably limited in the bushing 5, the guide tube 6 and the hollow spindle 1 may be rotated synchronously, and the guide tube 6 may be telescoped relative to the hollow spindle 1 in the axial direction.

A lower end of the transmission worm 2 is fixedly connected with a transmission part 21, and a lower end of the hollow spindle 1 is fixedly connected with a guide bar 11; both the guide bar 11 and the transmission part 21 are of a non-cylindrical structure; both the hollow spindle 1 and the guide tube 6 have a non-round inner hole; the non-cylindrical structure of the transmission part 21 is adapted to the non-round inner hole of the hollow spindle 1 such that the transmission worm 2 and the hollow spindle 1 are rotated synchronously, and the non-cylindrical structure of the guide bar 11 is adapted to the non-round inner hole of the guide tube 6 such that the hollow spindle 1 and the guide tube 6 are rotated synchronously. In this embodiment, the non-cylindrical structures preferably adopted by the guide bar 11 and the transmission part 21 both include a cylindrical body and a projected key provided on a cylindrical surface of the cylindrical body; the non-round inner holes of the hollow spindle 1 and the guide tube 6 both include a round inner hole and a keyway provided on a hole wall of the round inner hole; the projected key on the transmission part 21 is snap-fitted with the keyway on the hollow spindle 1, thereby implementing power transmission between the transmission worm 2 and the hollow spindle 1; the projected key on the guide bar 11 is snap-fitted with the keyway on the guide tube 6, thereby further implementing power transmission between the hollow spindle 1 and the guide tube 6. It is noted that the non-cylindrical structure and the non-round inner hole are not limited to the structures above, which may also be a fitting between a D-shaped bar and a D-shaped hole or a fitting between a polygonal bar and a polygonal hole, which is not limited as long as the non-cylindrical structure and the non-round inner hole may implement power transmission between the transmission worm 2 and the hollow spindle 1 and between the hollow spindle 1 and the guide tube 6. Specific structures are not exhausted here.

In this embodiment, the hollow spindle 1 is bushed with a first bearing 12, the first bearing 12 being fixedly mounted to the first transmission nut 3. Specifically, a stepped surface parallel to an upper end surface of the hollow spindle 1 is milled out on an upper end axial surface of the hollow spindle 1, wherein the first bearing is mounted on the stepped surface; while an annular snap-groove is machined out on the axial surface milled on the upper end of the hollow spindle 1, wherein a snap spring 13 is mounted in the annular snap groove and the snap spring 13 abuts against the upper end surface of the first bearing 12, thereby implementing rotatable positioning of the hollow spindle 1 relative to the first transmission nut 3 in the axial direction. Arrangement of the first bearing 12 enables the hollow spindle 1 to rotate stably and also enables the first hollow spindle 1 and the first bearing 12 to perform a synchronous linear motion. This connection structure is very compact and facilitates downsizing of the transmission assembly.

In this embodiment, a locking structure 7 limiting the first transmission nut 3 from rotating is provided on the external portion of the first transmission nut 3, wherein the locking structure 7 comprises a plurality of projections 7a provided on an outer wall of the first transmission nut 3, and a first locking block 71 and a second locking block 72 which are provided at an outer periphery of the first transmission nut 3; wherein the first locking block 71 is provided with a first accommodation groove; the second locking block 72 is provided with a second accommodation groove; after the first locking block 71 and the second locking block 72 are engaged, the first accommodation groove and the second accommodation groove are engaged to form an accommodation space, wherein the first transmission nut 3 is disposed in the accommodation space; on a groove wall of the first accommodation groove is provided a first snap groove 71a, and on a groove wall of the second accommodation groove is provided a second snap groove, the first snap groove 71a and the second snap groove being correspondingly snap-fitted with a projection 7a, respectively.

In this embodiment, a side surface of the first locking block 71 interfaced with the second locking block 72 is provided with a first fixed column 711 and a first fixed hole 712, and a side surface of the second locking block 72 interfaced with the first locking block 71 is provided with a second fixed column and a second fixed hole, wherein after the first locking block 71 and the second locking block 72 are engaged, the first fixed column 711 is plug-fitted with the second fixing hole and the second fixed column is plug-fitted with the first fixing hole 712, thereby limiting the first locking block 71 and the second locking block 72 from moving in the axial direction of the lifting assembly, i.e., implementing that the first locking block 71 and the second locking block 72 lock the first transmission nut 3. As the first snap groove 71a and the second snap groove 72a are snap-fitted with a projection 7a while the locking structure 7 is fixedly mounted after the transmission assembly is mounted in the lifting column, limiting the locking structure 7 from rotation causes the first transmission nut 3 to be limited from rotating; therefore, when the hollow spindle 1 is rotated, the locking structure 7 will move, along with the first transmission nut 3, linearly relative to the hollow spindle 1; at this point, the locking structure 7 also serves as a power transmission part to actuate the lifting column to be lifted or lowered.

Embodiment II

Figure 3:
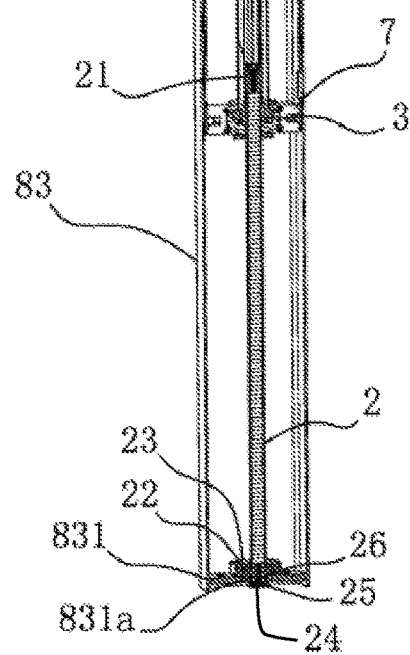
FIG. 3 is a sectional view of a lifting column in a second embodiment of the present disclosure.
Figure 4:
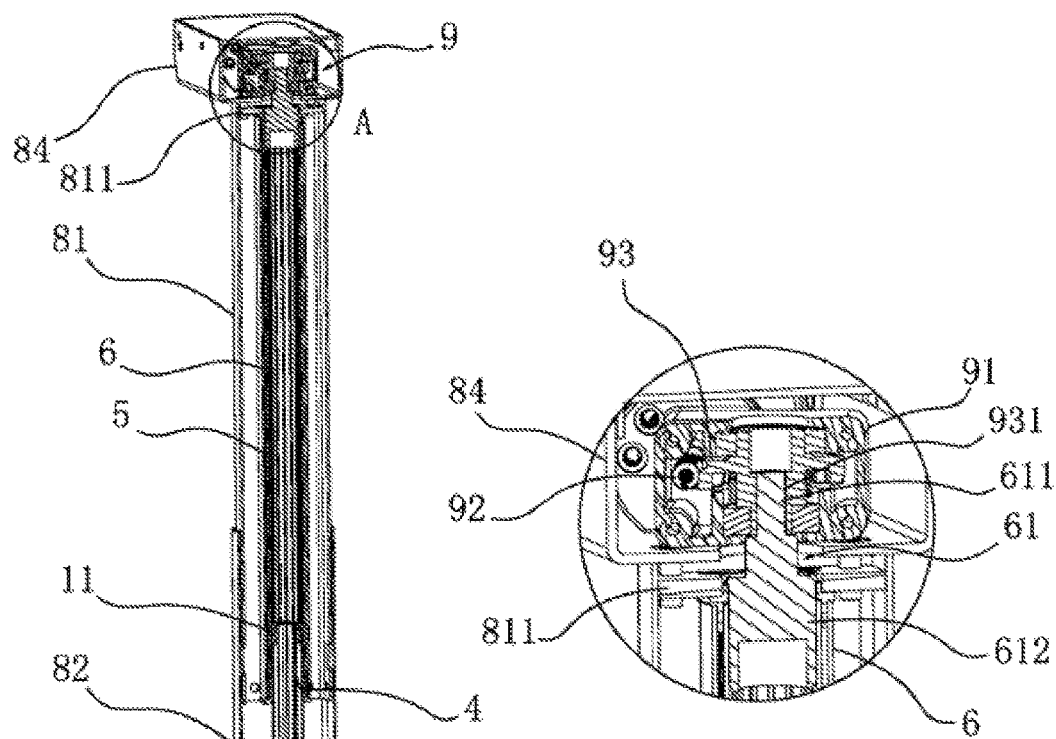
FIG. 4 is a partially enlarged view of area A in FIG. 3.

As shown in FIGS. 1, 3 and 4, a lifting column according to the present disclosure comprises an inner tube 81, a middle tube 82, an outer tube 83, which are sequentially bushed from inside to outside, a bottom housing 84 fixedly connected to an upper end of the inner tube 81, an actuating device 9 disposed in the bottom housing 84, and a transmission assembly in transmission fit with the actuating device 9. The transmission assembly refers to the transmission assembly mentioned in Embodiment 1. In contrast with the transmission assembly in FIG. 1, the transmission assembly in FIG. 3 is reversely-assembled, wherein the actuating device 9 is in transmission fit with an upper end of the guide tube 6; a lower end of the outer tube 83 is provided with a base plate 831; a locking structure 7 is fixedly connected with a lower end of the middle tube 82; an upper end of the inner tube 81 is provided with a top plate 811; the top plate 811 is fixed with an upper end surface of the bushing 5 via a bolt; the top plate 811 and the bottom housing 84 are also fixedly connected via a bolt, thereby implementing a fixed connection between the bushing 5 and the bottom housing 84.

A lower end of the transmission worm 2 is bushed with a second bearing 22; the second bearing 22 is fixed in a bearing seat 23; the bearing seat 23 has an accommodation groove; the second bearing 22 is mounted in the accommodation groove; the bearing seat 23 is fixedly connected with the upper end surface of the base plate 831 and the base plate 831 covers an opening of the accommodation groove, such that the second bearing 22 is limited in the accommodation groove by the base plate 831, thereby implementing that a lower end of the transmission worm 2 is rotatably positioned relative to the base plate 831 in the axial direction. To enable the transmission worm 2 and the second bearing 22 to be firmly assembled, a screw hole 24 is provided at a lower end of the transmission worm 2, and a holder block 25 is bushed at a lower end of the transmission worm 2; a through hole 831a available for the holder block 25 to penetrate through is provided on the base plate 831; the holder block 25 is connected to the screen hole 24 via a bolt 26, such that the holder block 25 tightly presses the second bearing 22 into the bearing seat 23.

As shown in FIGS. 2 and 4, in this embodiment, the actuating device 9 comprises a motor 91, a worm 92 connected to an output shaft of the motor 91, a worm gear 93 in transmission fit with the worm 92, and an irregular hole 931 is provided on the worm gear 93; wherein the inner hole of the guide tube 6 and the irregular hole 931 implement power transmission via a first irregular bar body 61; the first irregular bar body 61 comprises a first input end 611 and a first output end 612, both of which are of a non-cylindrical structure, preferably a hexagonal bar body structure; the irregular hole 931 and the inner hole of the guide tube 6 preferably adopt a hexagonal hole; the first input end 611 is adapted to the irregular hole 931, and the first output end 612 is adapted to the inner hole of the guide tube 6, thereby implementing power transmission between the worm gear 93 and the guide tube 6.

An operating process of the lifting column according to the present disclosure is provided as follows: the motor 91 in the actuating device 9 drives the woi in 92 to rotate; the worm 92 drives the worm gear 93 to rotate; the worm gear 93 drives, via the first irregular bar body 61, the guide tube 6 to rotate; the guide tube 6 drives, via the guide bar 11, the hollow spindle 1; the hollow spindle 1 drives, via the transmission part 21, the transmission worm 2 to rotate; in this way, the guide tube 6, the hollow spindle 1, and the transmission worm 2 are driven by the worm 93 to rotate synchronously. As the transmission worm 2 and the base plate 83 are axially limited, the first transmission nut 3 is lifted or lowered along an axial direction of the transmission worm 2. The first transmission nut 3 drives, via the locking structure 7, the middle tube 82 to be lifted or lowered, such that the hollow spindle 1 is lifted or lowered with the first transmission nut 3 while rotating, and the second transmission nut 4 is lifted and lowered along an axial direction of the hollow spindle 1. The second transmission nut 4 drives, via the guide tube 6, the actuating device 9 to be lifted or lowered, and the actuating device 9 drives the bottom housing 84 and the outer tube 83 which is connected with the bottom housing 84 to be lifted or lowered, thereby implementing lifting or lowering of the lifting column. During this process, the guide bar 11 generates a linear displacement along an inner hole of the guide tube 6, wherein the guide tube 6 plays a guiding role to the hollow spindle 1, such that the transmission assembly does not easily wobble radially, causing the operation of the transmission assembly more stable.

Embodiment III

Figures 5, 6:
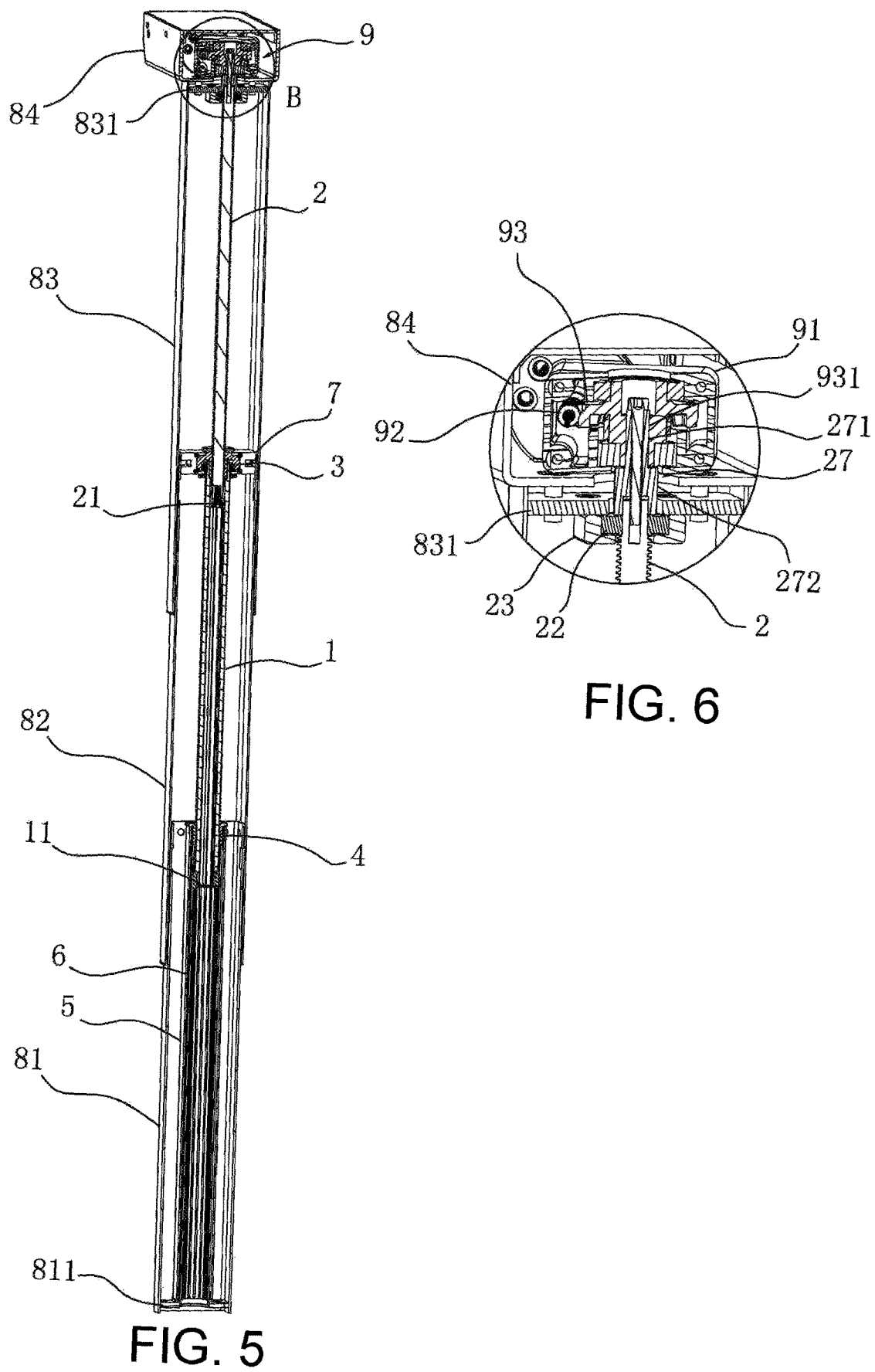
FIG. 5 is a sectional view of a lifting column in a third embodiment of the present disclosure.
FIG. 6 is a partially enlarged view of area B in FIG. 5.

As shown in FIGS. 2, 5, and 6, this embodiment differs from Embodiment II in that the bottom housing 84 of the lifting column is fixedly connected to the upper end of the outer tube 83, the actuating device 9 is in transmission fit with the upper end of the transmission worm 2, the locking structure 7 is fixedly connected with the upper end of the middle tube 82, and the transmission assembly is the one shown in FIG. 2 except that the assembling direction in this embodiment is reversal to that in Embodiment II. In embodiment II, the base plate 831 is disposed at an upper end of the outer tube 83; the base plate 831 and the bottom housing 84 are fixedly connected via a bolt; in Embodiment II, the top plate 811 is disclosed at a lower end of the inner tube 81, and the lower end of the bushing 5 is fixedly connected to the top plate 811 via a bolt, thereby implementing that the lower end of the bushing 5 abuts against the lower end surface of the inner tube 81.

However, in Embodiment III, the transmission worm 2 and the irregular hole 931 implement power transmission via a second irregular bar body 27; the second irregular bar body 27 comprises a second input end 271 and a second output end 272, both of the second input end 271 and the second output end 272 are of a non-cylindrical structure, preferably a hexagonal bar body structure; the irregular hole 931 preferably adopts a hexagonal hole; the second input end 271 is adapted to the irregular hole 931; the second output end 272 and the transmission worm gear 2 are fixedly connected via a bolt, thereby implementing power transmission between the worm gear 93 and the transmission worm 2.

The operating principle of the lifting column in this embodiment is substantially identical to Embodiment II, except that the worm gear 93 drives, via the second irregular bar body 27, the transmission worm 2 to rotate; at this point, the transmission worm 2 is a driving-to-rotate part, while the guide tube 6 is a driven-to-rotate part.

What have been illustrated above are preferred embodiments of the present disclosure, which cannot be understood as limiting of the embodiments. The preferred embodiments of the present disclosure are not limited to the embodiments above, and changes to specific structures are allowed. Those skilled in the art may make various alterations and variations based on the present disclosure, which should all fall into the scope defined by the appended claims of the present disclosure without departing from the spirit of the present disclosure.

What is claimed is:

1. A transmission assembly, comprising:
    a hollow spindle, an outer wall of which is provided with an outer thread;
    a transmission worm disposed in the hollow spindle, wherein the transmission worm is synchronously rotatable with the hollow spindle and the transmission worm is telescopable relative to the hollow spindle in an axial direction;
    a first transmission nut which is thread-fitted with the transmission worm, wherein the hollow spindle is rotatably positioned relative to the first transmission nut in the axial direction, and an external portion of the first transmission nut is provided with a locking structure for limiting the first transmission nut from rotating, and when the hollow spindle is rotated, the locking structure limits the first transmission nut from rotating;
    a second transmission nut which is thread-fitted with the hollow spindle;
    a bushing which is bushed outside of the hollow spindle, the second transmission nut being fixedly connected with the bushing; and
    a guide tube which is rotatably disposed in the bushing, wherein the guide tube is synchronously rotatable with the hollow spindle, and the guide tube is telescopable relative to the hollow spindle in the axial direction.

2. The transmission assembly according to claim 1, wherein a lower end of the hollow spindle is fixedly connected with a guide bar; the guide bar is of a non-cylindrical structure; the guide tube has a non-round inner hole; and the non-cylindrical structure and the non-round inner hole are adapted such that the hollow spindle and the guide tube are synchronously rotated.

3. The transmission assembly according to claim 1, wherein the hollow spindle is bushed with a first bearing, the first bearing being fixedly mounted to the first transmission nut.

4. The transmission assembly according to claim 1, wherein the locking structure comprises a plurality of projections provided on an outer wall of the first transmission nut, and a first locking block and a second locking block which are provided at an outer periphery of the first transmission nut, wherein the first locking block is provided with a first accommodation groove; the second locking block has a second accommodation groove; after the first locking block and the second locking block are engaged, the first accommodation groove and the second accommodation groove are engaged to form an accommodation space, wherein the first transmission nut is disposed in the accommodation space; on a groove wall of the first accommodation groove is provided a first snap groove, and on a groove wall of the second accommodation groove is provided a second snap groove, the first snap groove and the second snap groove being correspondingly snap-fitted with a projection, respectively.

5. The transmission assembly according to claim 4, wherein a side surface of the first locking block interfaced with the second locking block is provided with a first fixed column and a first fixed hole, a side surface of the second locking block interfaced with the first locking block is provided with a second fixed column and a second fixed hole, such that after the first locking block and the second locking block are engaged, the first fixed column is plug-fitted with the second fixed hole, and the second fixed column is plug-fitted with the first fixed hole.

6. The transmission assembly according to claim 1, wherein the transmission worm is bushed with a second bearing, the second bearing being fixed into a bearing seat.

7. A lifting column, comprising: an inner tube, a middle tube, an outer tube, which are sequentially bushed from inside to outside, a bottom housing fixedly connected to an upper end of the inner tube, an actuating device disposed in the bottom housing, and a transmission assembly in transmission fit with the actuating device; wherein the transmission assembly refers to the transmission assembly according to claim 1; the actuating device is in transmission fit with an upper end of the guide tube; a lower end of the outer tube is provided with a base plate; a lower end of the transmission worm is rotatably positioned relative to the base plate in the axial direction; the locking structure is fixedly connected to a lower end of the middle tube; and the bushing is fixedly connected with the bottom housing.

8. The lifting column according to claim 7, wherein the actuating device comprises a motor, a worm connected to an output shaft of the motor, and a worm gear in transmission fit with the worm, wherein an irregular hole is provided on the worm gear, and power transmission between an inner hole of the guide tube and the irregular hole is implemented via a first irregular bar.

9. A lifting column, comprising: an inner tube, a middle tube, an outer tube, which are sequentially bushed from inside to outside, a bottom housing fixedly connected to an upper end of the outer tube, an actuating device disposed in the bottom housing, and a transmission assembly in transmission fit with the actuating device; wherein the transmission assembly refers to the transmission assembly according to claim 1; the actuating device is in transmission fit with an upper end of the transmission worm; the locking structure is fixedly connected to an upper end of the middle tube; and a lower end of the bushing abuts against a lower end surface of the inner tube.

10. The lifting column according to claim 9, wherein the transmission worm is sleeved with a second bearing, the second bearing being fixed in a bearing seat, the bearing seat being fixedly connected with the bottom housing.

11. The lifting column according to claim 9, wherein the actuating device comprises a motor, a worm connected to an output shaft of the motor, and a worm gear in transmission fit with the worm, wherein an irregular hole is provided on the worm gear, and power transmission between the transmission worm and the irregular hole is implemented via a second irregular bar.

* * * * *